United States Patent
DeKoning et al.

(10) Patent No.: US 6,754,853 B1
(45) Date of Patent: Jun. 22, 2004

(54) TESTING COMPONENTS OF A COMPUTERIZED STORAGE NETWORK SYSTEM HAVING A STORAGE UNIT WITH MULTIPLE CONTROLLERS

(75) Inventors: Rodney A. DeKoning, Augusta, KS (US); Charles D. Binford, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 632 days.

(21) Appl. No.: 09/731,991

(22) Filed: Dec. 7, 2000

(51) Int. Cl.$^7$ .............................................. G06F 11/00
(52) U.S. Cl. ......................................... 714/42; 714/43
(58) Field of Search ............................... 714/42, 43, 5, 714/55

(56) References Cited

U.S. PATENT DOCUMENTS

| | | | | |
|---|---|---|---|---|
| 5,533,194 A | * | 7/1996 | Albin et al. ................... | 714/42 |
| 5,615,335 A | * | 3/1997 | Onffroy et al. ................ | 714/30 |
| 5,958,072 A | * | 9/1999 | Jacobs et al. .................. | 714/30 |
| 5,975,738 A | * | 11/1999 | DeKoning et al. ............. | 700/79 |
| 6,192,483 B1 | * | 2/2001 | Moiin et al. ..................... | 714/4 |
| 6,269,330 B1 | * | 7/2001 | Cidon et al. ................... | 714/43 |
| 6,324,663 B1 | * | 11/2001 | Chambers ..................... | 714/726 |
| 6,408,406 B1 | * | 6/2002 | Parris ............................. | 714/41 |
| 6,484,269 B1 | * | 11/2002 | Kopylovitz ...................... | 714/5 |
| 6,584,587 B1 | * | 6/2003 | McDermott .................... | 714/55 |
| 6,598,174 B1 | * | 7/2003 | Parks et al. ..................... | 714/6 |
| 6,598,183 B1 | * | 7/2003 | Grieco et al. .................. | 714/43 |
| 6,601,195 B1 | * | 7/2003 | Chirashnya et al. ........... | 714/43 |

* cited by examiner

Primary Examiner—Nadeem Iqbal
Assistant Examiner—Tim Bonura
(74) Attorney, Agent, or Firm—Duft, Setter, Ollila & Bornsen, LLC (57) ABSTRACT

An array controller of a data storage system initiates a test of another array controller of the data storage system to determine the operational condition of the controller under test (CUT) as well as an array of storage devices to which the CUT is connected and a network fabric over which the CUT receives commands from host devices of the data storage system. If the CUT or devices connected thereto are not functioning properly, the controller initiating the test can diagnose the problem. The controller initiating the test instructs the CUT to perform certain normal operating functions, e.g. data read and write functions, and checks whether the functions are completed correctly. Additionally, a loopback test checks the operation of the network fabric, and the read and write functions also check the operation of the storage devices.

32 Claims, 4 Drawing Sheets

TESTING COMPONENTS OF A COMPUTERIZED STORAGE NETWORK SYSTEM HAVING A STORAGE UNIT WITH MULTIPLE CONTROLLERS

FIELD OF THE INVENTION

This invention relates to data storage in a computerized storage area network (SAN) or system utilizing multiple controllers. More particularly, the present invention relates to a new and improved technique of determining whether one of the controllers or a device connected to the controller is functioning properly. Rather than merely detecting a lack of response to a data access request and inferring that something is not working, a test of certain capabilities of the controller is initiated so that particular problems can be diagnosed.

BACKGROUND OF THE INVENTION

In a computerized storage area network (SAN), various storage devices, such as hard drives, compact disc (CD) drives, tape drives and the like, are used to store data. The storage devices are typically arranged in groups, such as a RAID (Redundant Array of Independent Drives) configuration. One or more redundant disk array controllers (a.k.a. RDAC) are connected to each group of storage devices to control access to the storage devices. The groups are sometimes contained in storage units, such as storage arrays, so the controllers handle data accesses between the individual storage devices within the storage array and other components of the SAN outside of the storage array.

The storage area network (SAN) also typically includes a plurality of host devices connected through a switched, or network, fabric to the storage arrays. The host devices access a plurality of logical data volumes present on the storage devices in the storage arrays, usually on behalf of a plurality of client devices which are typically connected to each host device. Each storage array is connected at the controllers to one or more host devices through the network fabric.

Each host device can typically transfer data with each storage array and the logical data volumes stored therein through more than one data path. Each data path extends through the switched fabric to one of the controllers in the storage array. Since the storage array typically contains two (and possibly more) of the controllers, the host device typically has two (and possibly more) data paths to each storage array. The controllers are "redundant" because typically either one can satisfy data access requests from any host device to any storage device or logical data volume on the storage array.

The redundancy ensures that the logical data volumes will be available to the host devices in the event that one of the data paths develops a problem or fails to operate. If a host device detects a failure in one of the data paths to a storage array, the host device switches to the other data path to access the storage array.

The host device typically detects the failure when the host device sends a data access request through the data path, but either a response is not returned within a predetermined time period or the response includes an error notification. The problem that caused the error or failure may have occurred in the data path (e.g. in the switched fabric, a networking device, a cable or other component of the data path) or in the host device (e.g. in a network interface card or host bus adapter through which the host device accesses the switched fabric) or in the storage array (e.g. in the array controller, the storage device or other component of the storage array). However, no determination is made by the host device regarding the cause of the failure. Instead, a notification is sent to a system administrator indicating the data path that is not responding. It is typically then left to the system administrator to perform the burdensome task of diagnosing or troubleshooting the problem that caused the failure.

It is with respect to these and other background considerations that the present invention has evolved.

SUMMARY OF THE INVENTION

The present invention relieves some of the burden from the system administrator for troubleshooting the problem that caused a failure in a data path by automatically initiating a test of one or more of the array controllers in the storage array and disabling certain non-functional equipment when a problem is detected. The present invention also monitors the functional condition or status of the storage array by periodically initiating the test of the array controller(s), so the status of the storage array can be determined even before the host device has detected a failure or error.

One of the array controllers initiates the test of the other array controller, so if the controller under test is not functioning properly, the controller initiating the test can provide explanatory results of the test to the host device or the system administrator. The test checks the operation of parts of the array controller, the storage devices and the network fabric, so if the problem exists in one of these components of the storage area network, the explanatory results can provide the location of the problem for the system administrator, who can then quickly correct the problem. Even if the test does not identify a problem in any of the checked components, when the host device, nevertheless, has detected a failure, then the test will have eliminated the checked components as the source of the problem, so the system administrator can focus any troubleshooting efforts elsewhere.

These and other improvements are achieved by testing the operational condition of one of the controllers in a computerized system that has at least two controllers and one or more storage devices. The controllers are for controlling access to computerized data stored on the storage devices. The second controller sends a test command to the first controller to cause the first controller to execute predetermined operating functions. In response, the first controller attempts to perform the predetermined operating functions, preferably by directing certain data access commands to the storage devices. The outcome of the attempted predetermined operating functions is analyzed to determine whether the first controller was successful in performing the predetermined operating functions. The operational condition of the first controller is then determined based on whether the first controller was successful in performing the predetermined operating functions.

The controller under test preferably performs a read operation and/or a write operation on one or more of the storage devices to test its ability to access the storage devices. For the read operation, the controller initiating the test preferably writes some test data to the storage devices and then passes some test information to the controller under test with which the controller under test can check the test data after reading the test data from the storage devices. For the write operation, the controller under test preferably generates additional test data from the same test information and writes the additional test data to the storage devices, so the controller initiating the test can read the additional test data and check it with the original test information. Additionally, to perform either or both of the read and write operations, the controller under test preferably issues read and/or write commands to itself, to which the controller under test responds in a normal fashion as if the read and/or write commands were generated externally. Furthermore, the computerized system is preferably part of a networked storage system, and the controller under test preferably sends the read and/or write commands to an external device, such as a network device, that returns, or "loops back," the commands to the controller under test.

The previously mentioned and other improvements are also achieved in a storage array for servicing data access requests received from the host devices through the network. The storage array includes an array of storage devices, two array controllers and a memory device (e.g. memory RAM). The array controllers are connected to each other, the network, the array of storage devices and the memory device. The memory device contains firmware instructions that cause the array controllers to perform a test of the operational conditions of one of the array controllers in which the second array controller initiates the test of the first array controller to determine whether the first array controller is operating. The first array controller attempts to perform predetermined operating functions, preferably reading data from and writing data to the array of storage devices. The outcome of the predetermined operating functions are analyzed to determine whether the first array controller was successful in performing the predetermined operating functions, which indicates the operational condition of the first array controller.

Under the read data function, the firmware instructions preferably cause the second array controller to generate test data and write it to the array of storage devices and the first array controller to read the test data from the array of storage devices and detect whether the test data is correct. Additionally, the second array controller preferably generates test information, which it uses to generate the test data and which the first array controller uses to detect whether the test data is correct.

Under the write data function, the firmware instructions preferably cause the first array controller to generate the test data and write it to the array of storage devices and the second array controller to read the test data from the array of storage devices and detect whether the test data is correct. Additionally, the first array controller preferably generates the test data from the test information that the second array controller sent to the first array controller. The second array controller uses the test information to determine whether the test data is correct. To perform the write data function under the firmware instructions, the first array controller preferably issues a write command to itself by sending the write command to the network with instructions to return the write command to the first array controller, so the first array controller can respond to receiving the write command by performing the write data function.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

DETAILED DESCRIPTION

Figure 1:
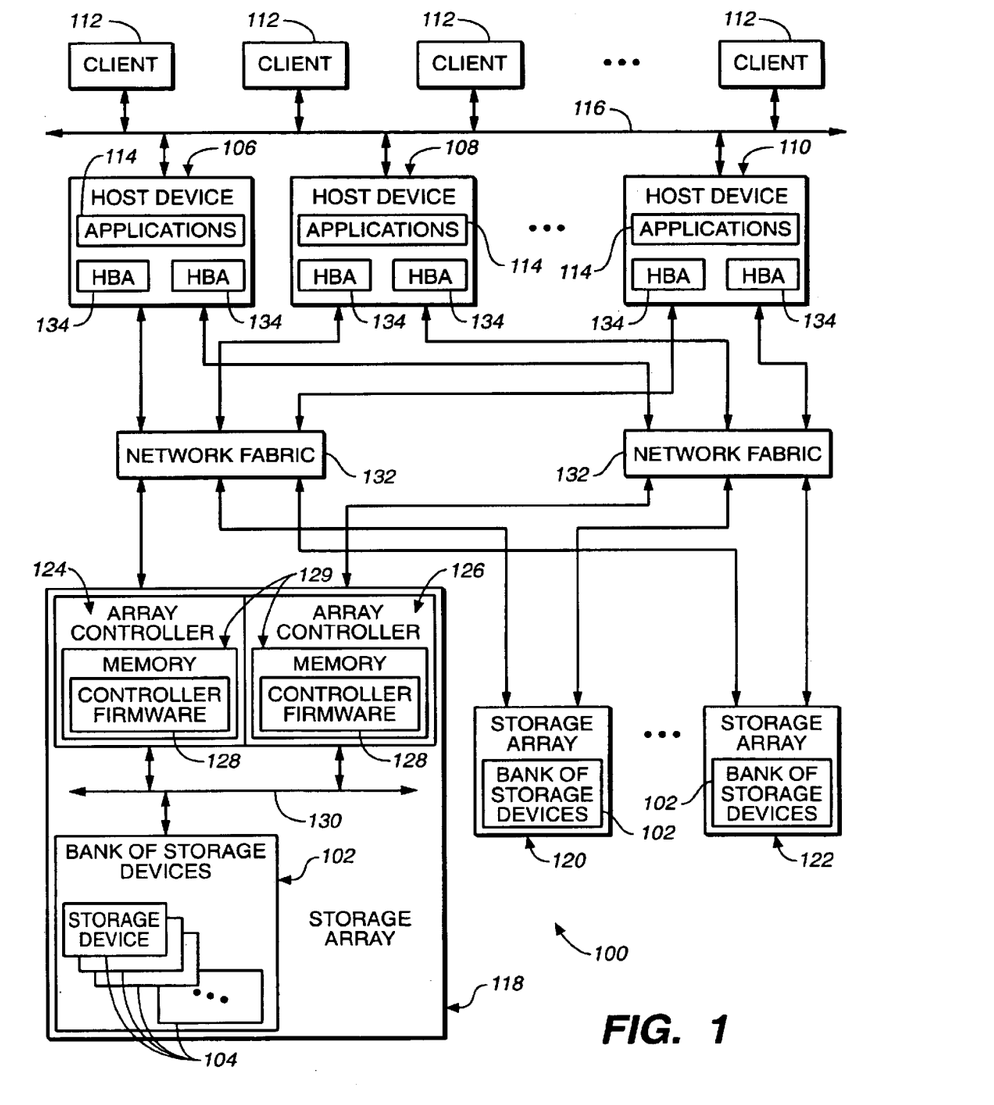
FIG. 1 is a block diagram of a storage area network (SAN) incorporating the present invention.

A data storage system or environment, such as a storage area network (SAN) 100 shown in FIG. 1, generally includes conventional banks 102 of several conventional storage devices 104 (e.g. hard drives, tape drives, etc.) that are accessed by one or more conventional host devices 106, 108 and 110. The host devices 106–110 typically access the storage devices 104 (primarily with data access requests, such as read and write requests) on behalf of one or more conventional client devices 112 or applications 114 running on the host devices 106–110. Each host device 106–110 is connected to one or more of the client devices 112 by one or more conventional communication links 116, such as a local area network (LAN). The banks 102 of storage devices 104 are incorporated in conventional high-volume, high-bandwidth storage units, or arrays, 118, 120 and 122. The storage arrays 118–122 also include conventional multi-host channel RAID (Redundant Array of Independent Disks) array controllers 124 and 126 (e.g. microprocessors), which work in concert to control the functions of the storage arrays 118–122 (e.g. responding to the read and write requests) in accordance with controller firmware 128 present in memory RAM 129. The controller firmware 128 includes software instructions for the operation of the array controllers 124 and 126. The array controllers 124 and 126 connect to the storage devices 104 in the bank of storage devices 102 through one or more conventional shared buses 130 in order to perform read and write data functions on the storage devices 104. According to the present invention, the array controllers 124 and 126 also perform tests of each other to determine whether they are operating properly.

Conventional network fabrics 132 connect the host devices 106–110 (at host bus adapters 134) to the storage arrays 118–122 (at the array controllers 124 and 126). In this case, the presence of two network fabrics 132 enables multiple data transfer paths between the host devices 106–110 and the storage arrays 118–122. The data transfer paths extend from the host bus adapters 134 through the network fabrics 132 to the array controllers 124 and 126. The tests which the array controllers 124 and 126 perform on each other also test whether the storage devices 104 and the network fabrics 132 to which the array controllers 124 and 126 are connected are operating properly.

Storage space in each of the banks of storage devices 102 within the storage arrays 118–122 is configured into logical data volumes (not shown). The host devices 106-110 utilize one or more of the logical data volumes to store data for the applications 114 or the client devices 112. Some of the logical data volumes are utilized by more than one host device 106–110 as "shared" volumes. The host devices 106–110 issue the data access requests, on behalf of the client devices 112 or applications 114, to the storage arrays 118–122 for access to the logical data volumes.

At least some of the host devices 106–110 can access some of the storage arrays 118–122 and the logical data volumes (not shown) stored on the storage devices 104 through more than one data transfer path through the network fabrics 132. Thus, the host devices 106–110 utilize conventional multi-pathing redundant disk array controller (RDAC) software (not shown) to issue the data access requests. When one of the host devices 106–110 has established a data transfer path to one of the array controllers 124 or 126 for one of the logical data volumes on the storage devices 104, the array controller 124 or 126 establishes "ownership" of the logical data volume. When one of the host devices 106–110 seeks to establish a different data transfer path to the other array controller 124 or 126 for the logical data volume, the array controllers 124 and 126 generally automatically transfer ownership of the logical data volume between themselves in an auto-volume-transfer event. For example, when one of the host devices 106–110 detects a problem in the currently established data transfer path, the host device 106–110 may attempt to switch to the other data transfer path, thereby causing an auto-volume-transfer event.

The tests of the operation of the array controllers 124 and 126 are initiated by one of the array controllers 124 or 126 to test the other array controller 126 or 124 and the storage devices 104 and network fabrics 132 to which the other array controller 126 or 124 is connected. Whereas the host devices 106–110 are capable of detecting only that the data transfer path in general is not operating when a response to a data access request has not been received through the data transfer path, the tests that the array controllers 124 and 126 initiate in each other enable the array controller initiating the test (e.g. the array controller 126) to diagnose more precisely where and what the problem is. For example, the test can determine whether the problem exists in the array controller under test (the array controller 124), the storage devices 104 or the network fabrics 132. The test can also determine whether the problem occurs during a read or write data function of the array controller under test 124 or the storage devices 104.

To determine where and what the problem is, the array controller initiating the test 126 instructs the other array controller 124 to perform certain predetermined normal operating functions, such as communicating with the network fabrics 132 and reading data from and writing data to the storage devices 104. In this manner, the array controller 124 uses all of the hardware and software (e.g. software stacks, write buffers, etc.) that it would use when responding to a command or data access request from the host device 106–110. The array controller 124 then sends a response back to the array controller 126 indicating the status of the operations that the array controller 124 performed, e.g. whether it detected that each operation completed correctly. The array controller 126 analyzes the response received from the array controller 124 for any reported error or failure conditions and then confirms whether the array controller 124 performed some of the operations correctly. For example, the array controller 126 reads from the storage devices the test data that the array controller 124 wrote to test its write functions and independently checks whether the test data is correct. Thus, the overall test determines whether the array controller 124 is functioning correctly from both a hardware and a software standpoint.

The tests are initiated periodically (e.g. every half-hour) and/or upon the occurrence of a particular event (e.g. an auto-volume-transfer). Periodic tests increase the likelihood that a problem in one of the array controllers 124 or 126 will be detected by the test with steps possibly taken to correct the problem before one of the host devices 106–110 encounters the problem. When one of the host devices 106–110 does encounter a problem in one of the data transfer paths to a logical data volume (not shown) on the storage devices 104 in one of the storage arrays 118–122, the host device 106–110 will likely attempt to use another data transfer path to the logical data volume, thereby causing an auto-volume-transfer event. Therefore, although there are other potential causes of an auto-volume-transfer event, it is preferable to perform the test on the array controller 124 or 126 from which the logical data volume is being transferred in order to determine whether there was a problem in the established data transfer path.

Figure 2:
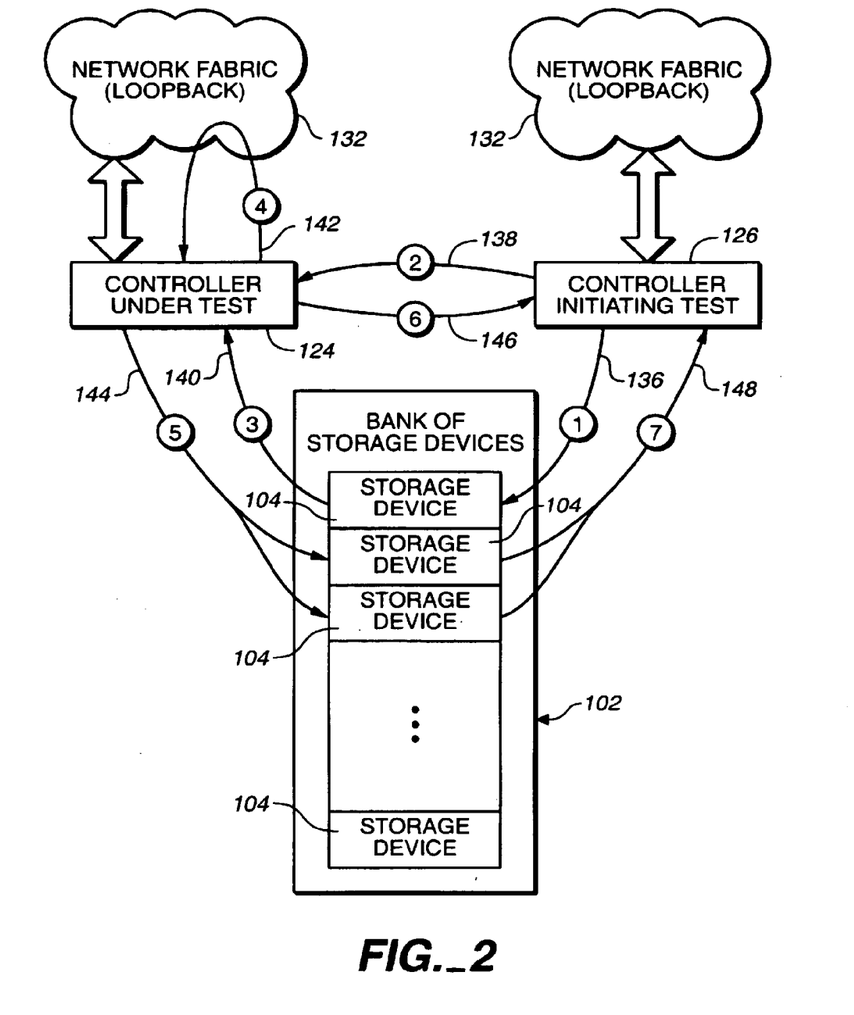
FIG. 2 is a flow diagram of the flow of commands and data between components of the SAN shown in FIG. 1 in executing the present invention.

The general flow of commands and data during the test is shown in FIG. 2. The array controller 126 (the array controller initiating the test) first acquires a time stamp, or other test information, that is to be used for the duration of the test. The time stamp is then written (arrow 136), along with additional test data, such as a data block and parity data, to one of the storage devices 104. The storage space to which the test data (i.e. the time stamp, the parity data, etc.) is written is preferably a region in the storage devices 104 specifically used by the array controller 124 (the array controller under test) for diagnostic purposes. The test data written by the array controller 126 is used to test the ability of the array controller 124 to read data from the storage devices 104 and to generate parity data. The array controller 126 then sends a test command (arrow 138), containing the time stamp, to the array controller 124 over the one or more shared buses 130 (FIG. 1) to cause the array controller 124 to perform the test. The array controller 126 then waits for a period of time for the array controller 124 to complete the test. If the array controller 124 does not respond within the period of time for the test, then the array controller 126 issues a reset command to the array controller 124, allows the array controller 124 to complete the boot process and then repeats the test command. If the array controller 126 has to reset the array controller 124 more than twice in, for example, a ten minute period of time, then the array controller 124 preferably is declared to have "failed" and is held in reset by the array controller 126 until the user or system administrator can correct the problem or replace the array controller 124.

Upon receiving the test command with the time stamp, the array controller 124 reads the test data (arrow 140) from the diagnostic regions of the storage devices 104 that were written by the array controller 126. Alternatively, upon receiving the test command with the time stamp, the array controller 124 sends a read command to itself through conventional loopback capabilities of the network fabric 132 to which the array controller 124 is connected. The array controller 124 then compares the time stamp that it received in the test command (arrow 138) with the time stamp that it received in the test data that it read from the storage devices 104 (arrow 140). If parity data was part of the test data, then the array controller 124 also generates parity data for the test data and compares it to the parity data read from the storage device 104.

If the comparisons of the test data, including the time stamp and the parity data, show the same data, then the read test is successful. If there is a discrepancy or error in any of the test data, however, the array controller 124 returns a test response to the array controller 126 indicating that the read test failed or records the error for sending to the array controller 126 later after completing the rest of the test. Additionally, if the array controller 124 encounters any other errors during the read test, such as a conventional error response from the storage device 104 or a failure of the storage device 104 to respond, then the array controller 124 reports these errors to the array controller 126. These additional errors indicate the existence of a problem in the storage device 104, rather than in the array controller 124.

The array controller 124 then develops new test data from the time stamp that it received from the array controller 126. The new test data is preferably different from the test data that the array controller 124 read from the storage device 104 and is used to test the data write function of the array controller 124. The array controller 124 then prepares a write command and sends the write command to the network fabric 132 (arrow 142) with conventional instructions for the network fabric 132 to loopback the write command to the array controller 124. Before sending the write command to the network fabric 132, the array controller 124 preferably queries the network fabric 132 or its connection to the network fabric 132 to check the status of the connection to the network fabric 132 and sends the write command only if the connection to the network fabric 132 is functioning. If the connection to the network fabric 132 is invalid, then the array controller 124 uses a conventional loopback capability within itself to issue the write command to itself. The array controller 124 also records whether it used the external loopback in the network fabric 132 or its own internal loopback capability, so the array controller 124 can report to the array controller 126 the method of performing the loopback. If the array controller 124 reports that it used its own internal loopback capability, then the array controller 126 determines that there is a problem in the network fabric 132 or the connection between the array controller 124 and the network fabric 132. The write command also includes a conventional command that instructs the array controller 124 not to cache the test data, so the array controller 124 must actually access the storage device 104 to perform the write function.

When the array controller 124 receives the write command, the array controller 124 processes the write command in the same manner that it would if it had received the write command from a host device 106–110. Thus, the array controller 124 writes the test data to one or more of the storage devices 104 (arrow 144) and uses its normal software stacks, parity generation (i.e. the XOR engine) and write buffers (not shown) to perform the write. The array controller 124 preferably writes the test data to a region of the storage devices 104 that is reserved for diagnostic purposes. The array controller 124 also records any conventional errors encountered during the write function for later reporting to the array controller 126. Such write errors typically indicate whether the problem that generated the error exists in the array controller 124 or the storage device 104.

After completing the write function or encountering an error that prevented completing the write function, the array controller 124 sends a response to the array controller 126 (arrow 146) indicating the status of the test. The status response includes any errors encountered by the array controller 124 in any part of the overall test, including reading the first test data from the storage device 104, sending the write command to the network fabric 132 and writing the second data to the storage devices 104. If the array controller 124 encountered no errors, then the status response indicates that all portions of the test completed correctly.

When the array controller 126 receives the status response from the array controller 124, the array controller 126 analyzes the status response to determine if any errors or failure conditions are reported by the array controller 124. The array controller 126 also reads the test data (arrow 148) from the storage devices 104 that was written by the array controller 124 (arrow 144). Then, using the time stamp that it originally generated, the array controller 126 checks whether the test data is correct.

If the array controller 126 finds no errors in the test data that it read from the storage devices 104 (arrow 148) and receives no errors in the status response (arrow 146) from the array controller 124, then the array controller 126 determines that the array controller 124 is operating properly. If the array controller 126 finds any error, then the array controller 126 updates the status of the array controller 124 (e.g. notifies the host devices 106–110 that the array controller 124 is offline), notifies the user or system administrator of the expected location and type of problem in the SAN 100 (FIG. 1) and, if necessary, places and holds the array controller 124 in reset. Alternatively, upon finding an error in the test, the array controller 126 resets the array controller 124 and then initiates the test again after the array controller 124 reboots. In this manner, some types of errors, such as some software errors, can be corrected without replacing any part of the SAN 100 or involving the user or system administrator.

There are a variety of different failure situations that may be detected. For example the array controller 124 might never respond after the array controller 126 initiates the test. Alternatively, the array controller 124 may respond, but indicate that it failed the test. Such failure indication may have resulted from the array controller 124 attempting to perform certain steps in the test, but not being able to do so. Some part of the array controller 124 may have failed while other parts are still working, and the array controller 124 may be able to detect and report which part failed. Additionally, the array controller 124 may report that it completely passed the test, but the array controller 126 may find an error in some part of the test.

Figure 3:
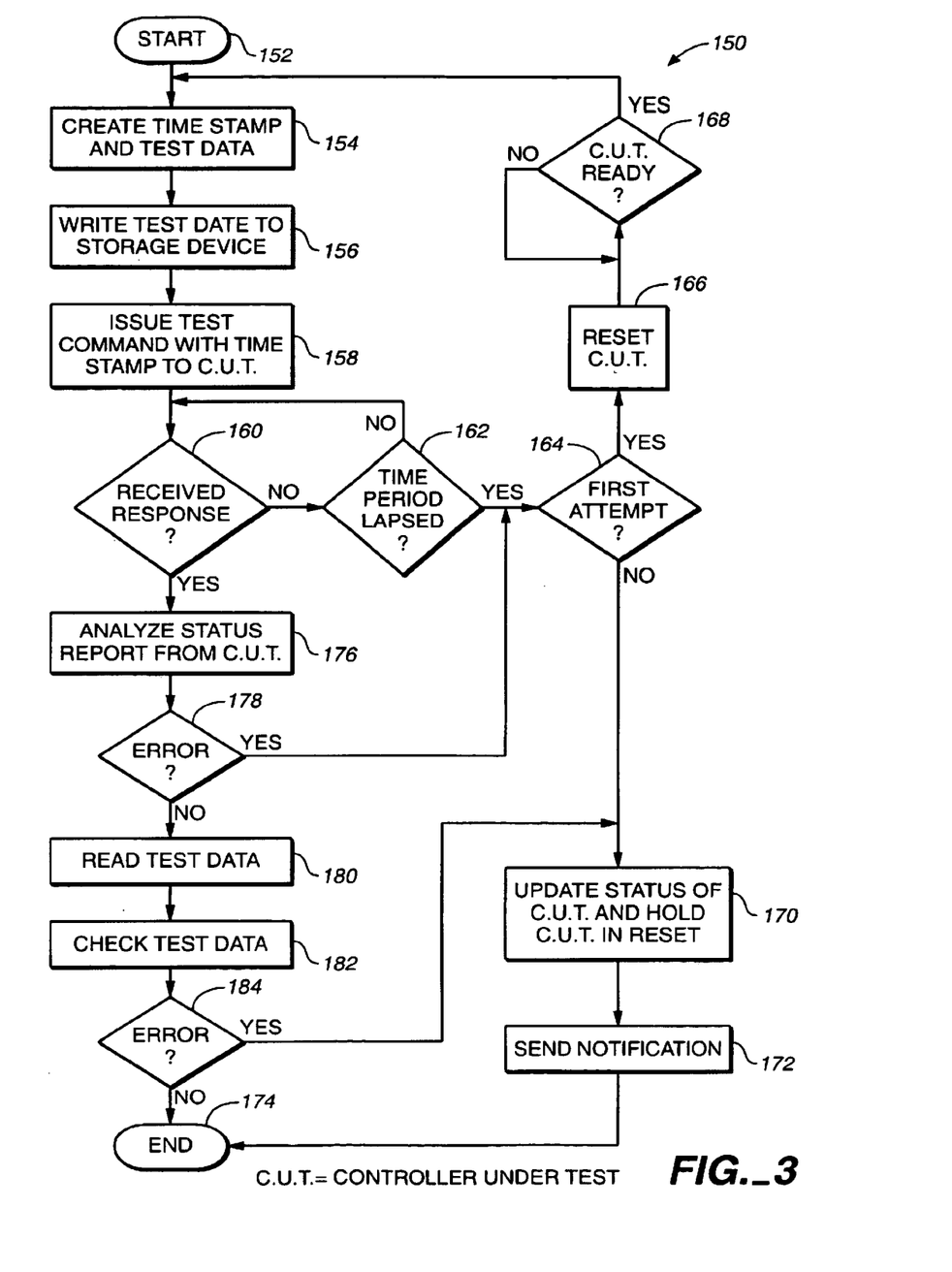
FIG. 3 is a flowchart of a procedure for one controller in a storage array of the SAN shown in FIG. 1 to initiate a test of another controller in the storage array.

A procedure 150 performed by the array controller 126 to initiate the test of the array controller 124 is shown in FIG. 3. The procedure 150 starts at step 152. At step 154, the time stamp is created and the test data for testing the read capabilities of the array controller 124 is generated. The read test data is written to one or more of the storage devices 104 (FIGS. 1 and 2) at step 156. The test command, including the time stamp, is issued, or sent, to the array controller 124 at step 158. The array controller 126 then waits at step 160 for a response to be returned from the array controller 124. As long as the response has not been received at step 160, the array controller 126 checks whether the time period for the test has lapsed at step 162. If the time period has not lapsed and the response has not been received, then the procedure 150 returns to step 160.

If the time period lapses at step 162, then it is determined at step 164 whether this test is the first attempt. If so, then the array controller 124 is reset at step 166 and the process 150 waits at step 168 for a sufficient period of time for the array controller 124 to reboot or become ready. Then the test is restarted at step 154. If it is determined at step 164 that this test is not the first attempt, then the status of the array controller 124 is updated at step 170 and the array controller 124 is placed and held in reset. At step 172, the user or system administrator is notified of the problem with the array controller 124. The procedure 150 then ends at step 174.

If a response is received at step 160 from the array controller 124, then the reported status from the array controller 124 is analyzed at step 176 for any reported errors or failure conditions. At step 178, if there is a reported error that prevented the array controller 124 from ever writing test data to the storage devices 104 (arrow 144, FIG. 2), then the procedure 150 branches to step 164 to proceed as described above depending on whether this test is a first attempt to test the array controller 124.

If it is determined at step 178 that the array controller 124 (FIGS. 1 and 2) had been able to write test data to the storage devices 104 (arrow 144, FIG. 2), then the array controller 126 reads the write test data from the storage devices 104 at step 180. The write test data is then checked at step 182 to determine if the write test data is correct based on the original time stamp created at step 154. At step 184, if an error is found in the write test data or any other error was reported in the received response (arrow 146, FIG. 2), then the procedure 150 branches to the step 170 to update the status of and, if necessary, hold the array controller 124 in reset. The user or system administrator is then notified of the problem at step 172, and the procedure 150 ends at step 174. If no errors are found at step 184, i.e. the array controller 124 successfully completed the test, then the procedure 150 ends at step 174. If the procedure 150 completes without finding any errors or problems, but the host device 106–110 (FIG. 1) cannot access the storage array 118–122 (FIG. 1) through the given data transfer path, then the test will have eliminated the array controller 124, the storage devices 104 (FIGS. 1 and 2) and the array controller's connection to the network fabric 132 (FIGS. 1 and 2) as the source of the problem.

Figure 4:
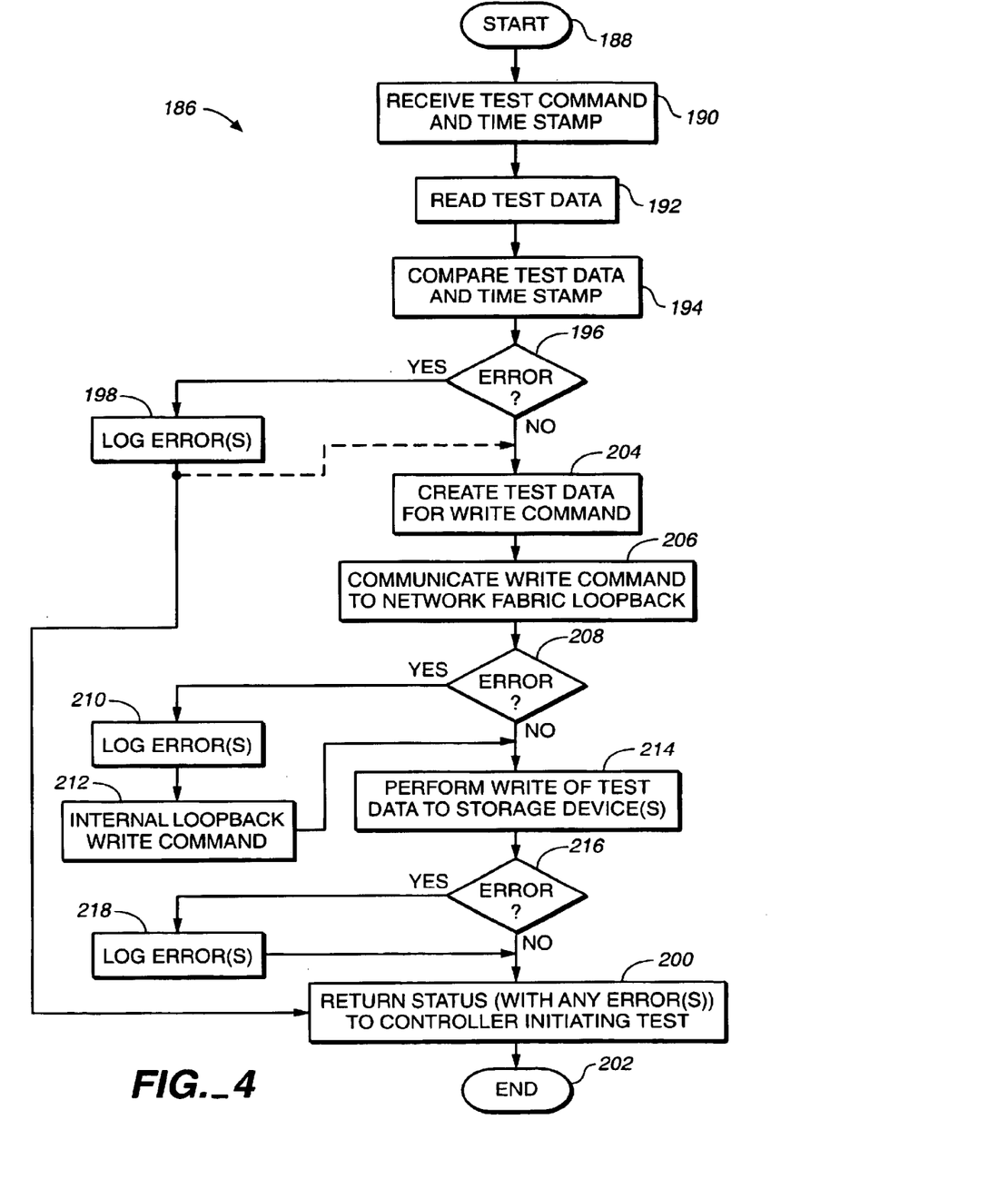
FIG. 4 is a flowchart of a procedure for the other controller in the storage array of the SAN shown in FIG. 1 to perform the test initiated by the procedure shown in FIG. 3.

A procedure 186 for the array controller 124 (FIGS. 1 and 2) to perform the test of itself is shown in FIG. 4. The procedure 186 starts at step 188. At step 190, the test command, including the time stamp, (arrow 138, FIG. 2) is received. The read test data that was written by the array controller 126 (arrow 136, FIG. 2) is read from the storage devices 104 (FIGS. 1 and 2) at step 192. The time stamp received in the test command at step 190 and the time stamp in the read test data are compared at step 194. If a discrepancy or error in the time stamp is found at step 196, then the error is logged or recorded at step 198, and the procedure 186 branches to step 200. At step 200, the error is reported to the array controller 126. The procedure 186 ends at step 202. Alternatively, after the error is recorded at step 198, the procedure 186 proceeds with the rest of the test at step 204.

If no error was encountered in performing the read function, as determined at step 196, then the write test data and the write command are created from the time stamp at step 204. The write command is sent to the network fabric 132 (FIGS. 1 and 2) at step 206. Alternatively, the array controller 124 (FIGS. 1 and 2) checks the status of its connection to the network fabric 132 before sending the write command. At step 208, it is determined whether there is an error or problem in performing the loopback function with the network fabric 132. For example, the array controller 124 may receive back an error signal in response to attempting to perform the loopback function, or the array controller 124 may not receive any response after a sufficient timeout period indicating that the network fabric 132 is not working or never received the request to perform the loopback function. If an error is detected, then the error is logged or recorded at step 210, and the write command is issued through the loopback capabilities internal to the array controller 124 at step 212. If no error was found at step 208, or the write command was issued internally at step 212, then the write test data is written to one or more of the storage devices 104 (FIGS. 1 and 2) at step 214. If any errors were encountered in performing the write function, as determined at step 216, then the errors are recorded or logged at step 218. Afterwards, or if no errors were found at step 216, then the status of the test, along with any errors, is returned to the array controller 126 in the test response (arrow 146, FIG. 2) at step 200. The procedure 186 then ends at step 202.

By using one array controller 126 (FIGS. 1 and 2) to initiate a test of another array controller 124 (FIGS. 1 and 2) within the same storage array 118–122 (FIG. 1) and to check the results, a more detailed test can be performed and diagnosis can be made than the host device 106–110 (FIG. 1) can perform from outside of the storage array 118–122. Thus, the present invention has the advantage of being able to determine more precisely the cause or location of a problem in the data transfer path between the host device 106–110 and the storage array 118–122 than can the host device 106–110. Therefore, the present invention has the further advantage of reducing the time and cost for diagnosing the problem, so the problem can be corrected more quickly and efficiently. Additionally, the present invention has the advantage of being able to perform the tests periodically to preemptively locate a potential problem, so that steps can be taken to correct the problem early. Furthermore, the present invention has the advantage of being able to eliminate the array controller 124, the storage devices 104 and the connection between the array controller 124 and the network fabric 132 as the source of the problem if the test finds no problem, but the host device 106–110 still cannot get a response through the data transfer path to the array controller 124.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method for testing an operational condition of a first controller in a computerized data storage system having the first controller, a second controller and one or more storage devices, the storage devices having data stored thereon, and the first and second controllers controlling the storage devices to store and retrieve the data onto and from the storage devices, comprising the steps of:

sending a test command from the second controller to the first controller to cause the first controller to execute predetermined operating functions wherein the predetermined operating functions include functions to test operations involving the first controller accessing the storage devices and wherein the predetermined operating functions include functions to test operations involving the first controller accessing a SAN fabric coupling the first controller to a host system;

responding to the test command by the first controller attempting to perform the predetermined operating functions;

analyzing an outcome of the first controller attempting to perform the predetermined operating fictions;

determining from the analyzed outcome whether the first controller was successful in performing the predetermined operating functions; and determining the operational condition of the first controller depending on the determination of whether the first controller was successful in performing the predetermined operating functions.

2. A method as defined in claim 1 comprising the further steps of:

attempting to access the storage devices by the first controller as part of the predetermined operating functions; and determining whether the first controller was successful in attempting to access the storage devices.

3. A method as defined in claim 2 comprising the further steps of:

generating test data by the second controller;

writing the test data from the second controller to the storage devices;

attempting to read the test data by the first controller from the storage devices; and determining whether the first controller was successful in attempting to read the test data from the storage devices.

4. A method as defined in claim 3 comprising the further steps of:

stopping accesses to the storage devices by the first controller when the first controller was not successful in reading the test data from the storage devices.

5. A method as defined in claim 3 comprising the further steps of:

generating test information by the second controller;

generating the test data from the test information;

passing the test information from the second controller to the first controller; and comparing the test data with the test information to determine whether the first controller was successful in reading the test data from the storage devices.

6. A method as defined in claim 3 comprising the further steps of:

generating a time stamp by the second controller;

generating the test data from the time stamp;

passing the time stamp from the second controller to the first controller; and comparing the test data with the time stamp to determine whether the first controller was successful in reading the test data from the storage devices.

7. A method as defined in claim 3 comprising the further step of:

issuing a read command from the first controller to itself prior to reading the test data.

8. A method as defined in claim 7 comprising the further steps of:

issuing the read command externally to the first controller;

returning the read command to the first controller; and responding to the read command by the first controller reading the test data from the storage devices.

9. A method as defined in claim 8, wherein the computerized data storage system is part of a networked storage system which includes a network device connected to the computerized data storage system through the first controller, comprising the further step of:

attempting to send the read command from the first controller to the network device with instructions for the network device to send the read command back to the first controller.

10. A method as defined in claim 9 comprising the further step of:

determining whether the network device is operating depending on whether the network device sent the read command back to the first controller.

11. A method as defined in claim 7 comprising the further steps of:

issuing the read command internally to the first controller; and responding to the read command by the first controller reading the test data from the storage devices.

12. A method as defined in claim 2 comprising the further steps of:

generating test data by the first controller;

attempting to write the test data by the first controller to the storage devices;

reading the test data by the second controller from the storage devices; and determining by the second controller whether the first controller was successful in attempting to write the test data to the storage devices.

13. A method as defined in claim 12 comprising the further step of:

stopping accesses to the storage devices by the first controller when the first controller was not successful in attempting to write the test data to the storage devices.

14. A method as defined in claim 12 comprising the further steps of:

generating test information by the second controller;

passing the test information from the second controller to the first controller;

generating the test data from the test information;

comparing the test data read by the second controller to the test information generated by the second controller; and determining by the second controller whether the first controller was successful in attempting to write the test data to the storage devices based upon the comparing of the test data to the test information.

15. A method as defined in claim 12 comprising the further steps of:

generating a time stamp by the second controller;

passing the time stamp from the second controller to the first controller;

generating the test data from the time stamp;

comparing the test data read by the second controller to the time stamp generated by the second controller; and determining by the second controller whether the first controller was successful in attempting to write the test data to the storage devices based upon the comparing of the test data to the time stamp.

16. A method as defined in claim 12 comprising the further step of:

issuing a write command from the first controller to itself using the SAN fabric prior to writing the test data.

17. A method as defined in claim 16 comprising the further steps of:

issuing the write command externally to the first controller;

returning the write command to the first controller; and responding to the write command by the first controller writing the test data to the storage devices.

18. A method as defined in claim 17, wherein the computerized data storage system is part of a networked storage system which includes a network device connected to the computerized data storage system through the first controller, comprising the further step of:

attempting to send the write command from the first controller to the network device with instructions for the network device to return the write command back to the first controller.

19. A method as defined in claim 18 comprising the further step of:

determining by the second controller whether the network device is operating depending on whether the network device return the write command to the first controller.

20. A method as defined in claim 16 comprising the further steps of:

issuing the write command internally to the first controller; and responding to the write command by the first controller writing the test data to the storage devices.

21. A method as defined in claim 2 comprising the further step of:
   determining by the second controller whether the storage devices are operating depending on whether the first controller was successful in attempting to access the storage devices.

22. A method as defined in claim 1 comprising the further steps of:
   attempting to detect by the first controller any first errors occurring under the test;
   sending a test response, including information regarding any first errors, from the first controller to the second controller;
   attempting to detect by the second controller any second errors occurring under the test; and
   determining by the second controller the operational condition of the first controller depending on any first and second errors that were detected.

23. A method as defined in claim 1 comprising the further steps of:
   resetting the first controller upon determining that the first controller was not successful in performing the predetermined operating functions; and
   repeating the previous steps at least once.

24. A storage array for servicing data access requests received from host devices through a SAN network, comprising:
   an array of storage devices containing data on behalf of the host devices;
   a first array controller connected to the network and to the array of storage devices to receive first data access requests from the host devices and to access the data contained on the array of storage devices in accordance with the first data access requests; and
   a second array controller connected to the network, the first array controller and the array of storage devices to receive second data access requests from the host devices, to access the data contained on the array of storage devices in accordance with the second data access requests and to exchange a test command with the first array controller; and
   a memory connected to the first and second array controllers and containing firmware instructions for causing the first and second array controllers to perform the following steps:
      initiating by the second array controller a test of the first array controller to determine an operational condition of the first array controller;
      sending the test command from the second array controller to the first array controller to cause the first array controller to perform predetermined operating functions wherein the predetermined operating functions include functions to test operations involving the first controller accessing the storage devices and wherein the predetermined operating functions include functions to test operations involving the first controller accessing a SAN fabric coupling the first controller to the host devices;
      attempting to perform by the first array controller the predetermined operating functions;
      determining by the second array controller whether the first array controller was successful in attempting to perform the predetermined operating functions; and
      determining by the second array controller the operational condition of the first array controller depending on the determination of whether the first array controller was successful in attempting to perform the predetermined operating functions.

25. A storage array as defined in claim 24 wherein:
   the firmware instructions further cause the first and second array controller to perform a test of a read data function of the first array controller in which the second array controller generates test data and writes the test data to the array of storage devices and the first array controller reads the test data from the array of storage devices and detects whether the test data is correct.

26. A storage array as defined in claim 25 wherein:
   the firmware instructions further cause the second array controller to generate test information, generate the test data from the test information and pass the test information to the first array controller and further cause the first array controller to detect whether the test data read by the first array controller is correct based on the test information.

27. A storage array as defined in claim 26 wherein:
   the firmware instructions further cause the first array controller to send a test response to the second array controller indicating whether the test data is detected as being correct and further cause the second array controller to determine the operational condition of the first array controller and the array of storage devices depending on the indication in the test response of whether the test data is detected as being correct by the first array controller.

28. A storage array as defined in claim 24 wherein:
   the firmware instructions further cause the first and second array controller to perform a test of a write data function of the first array controller in which the first array controller generates test data and writes the test data to the array of storage devices and the second array controller reads the test data from the array of storage devices and detects whether the test data is correct.

29. A storage array as defined in claim 28 wherein:
   the firmware instructions further cause the second array controller to generate test information, to pass the test information to the first array controller and to detect whether the test data written by the first array controller is correct based on the test information and further cause the first array controller to generate the test data from the test information.

30. A storage array as defined in claim 29 wherein:
   the firmware instructions further cause the second array controller to determine the operational condition of the first array controller and the array of storage devices depending on the detection of whether the test data written by the first array controller is correct.

31. A storage array as defined in claim 28 wherein:
   the firmware instructions further cause the first array controller to issue a write command to itself to perform the write data function under the test.

32. A storage array as defined in claim 31 wherein:
   the firmware instructions further cause the first array controller to send the write command to the network with instructions for the network to return the write command to the first array controller and further cause the first array controller to respond when it receives the write command by performing the write data function.

* * * * *